(12) United States Patent  (10) Patent No.: US 7,544,097 B2
Hong et al.  (45) Date of Patent: Jun. 9, 2009

(54) CARD CONNECTOR

(75) Inventors: Fan Shin Hong, Singapore (SG); Shao Yenn Florence Chee, Singapore (SG); Taichi Inoue, Kanagawa (JP)

(73) Assignees: J.S.T. Mfg. Co., Ltd., Osaka (JP); MEA Technologies Pte. Ltd., Singapore (SG)

( * ) Notice: Subject to any disclaimer, the term of this patent is extended or adjusted under 35 U.S.C. 154(b) by 0 days.

(21) Appl. No.: 12/155,498

(22) Filed: Jun. 5, 2008

(65) Prior Publication Data

US 2008/0305669 A1 Dec. 11, 2008

(30) Foreign Application Priority Data

Jun. 8, 2007 (SG) .............................. 200704179-1

(51) Int. Cl.
*H01R 24/00* (2006.01)
(52) U.S. Cl. ...................... 439/626; 439/157; 439/331; 439/377; 439/607; 439/188
(58) Field of Classification Search .................. 439/64, 439/153, 188, 260, 325, 326, 329, 331, 377, 439/607, 626, 629, 630
See application file for complete search history.

(56) References Cited

U.S. PATENT DOCUMENTS

| 4,743,746 | A |   | 5/1988 | Murschall et al. |         |
|-----------|---|---|--------|------------------|---------|
| 5,877,488 | A | * | 3/1999 | Klatt et al.     | 235/486 |
| 5,933,328 | A |   | 8/1999 | Wallace et al.   |         |
| 6,062,889 | A | * | 5/2000 | Hyland et al.    | 439/326 |
| 6,352,445 | B2|   | 3/2002 | Takei et al.     |         |
| 6,386,920 | B1|   | 5/2002 | Sun et al.       |         |
| 6,394,817 | B1|   | 5/2002 | Kihira et al.    |         |
| 6,471,550 | B2| * | 10/2002| Maiterth et al.  | 439/631 |
| 6,602,096 | B1| * | 8/2003 | Kronestedt et al.| 439/630 |
| 6,642,614 | B1|   | 11/2003| Chen             |         |
| 6,869,302 | B2| * | 3/2005 | Bricaud et al.   | 439/326 |
| 7,029,306 | B2| * | 4/2006 | Bilcauu et al.   | 439/326 |
| 7,435,119 | B2| * | 10/2008| Chang et al.     | 439/188 |
| 2004/0161965 | A1 | * | 8/2004 | Bricaud et al. | 439/489 |
| 2006/0054697 | A1 |   | 3/2006 | Lin et al.     |         |
| 2006/0063422 | A1 |   | 3/2006 | Lu et al.      |         |
| 2008/0305665 | A1 | * | 12/2008| Hong et al.    | 439/153 |
| 2008/0305669 | A1 | * | 12/2008| Hong et al.    | 439/329 |
| 2008/0305685 | A1 | * | 12/2008| Hong et al.    | 439/626 |

FOREIGN PATENT DOCUMENTS

JP 2003-197296 A 7/2003

* cited by examiner

*Primary Examiner*—James Harvey
(74) *Attorney, Agent, or Firm*—Rader, Fishman & Grauer, PLLC

(57) ABSTRACT

A card connector has: a connector housing which is formed therein so as to be enclosed on three sides by an opposed pair of first and second frames and a third frame that links the end portions of the first and second frames; and an open-close cover. The open-close cover has a sensing member that senses the installation status of the card, and a cover locking mechanism that latches onto either the first or the second frame and locks the open-close cover in the closed state. The rear of the open-close cover is rotatably pivoted on the first and second frames. The card's installation status is sensed by closing the open-close cover and positioning the sensing member at the rear end portion of the card; and the open-close cover is retracted, being thereby locked in the closed state via the cover locking mechanism.

10 Claims, 14 Drawing Sheets

CARD CONNECTOR

BACKGROUND

1. Technical Field

The present invention relates to a card connector that is installed and used in various electronic equipment such as personal computers and portable terminals. More particularly, the invention relates to a card connector into which small-size cards such as memory cards of differing outer-dimension size and thickness can be inserted.

2. Related Art

Installed in various electronic equipment such as personal computers and portable terminals, card connectors have been used for insertion of small-size cards, etc., with built-in CPU or memory IC, etc., such as micro MMCs (multi media cards) or micro SD (super density) cards, so as to expand the capabilities of such equipment.

A typical example of such a card connector is set forth in JP-A-2003-197296. This card connector has a connector housing with a card insertion aperture at the front and a card holding cavity inside, and multiple contact terminals that are fitted in the inner part of the card holding cavity; the structure is such that two card types of differing size and thickness can be inserted through the insertion aperture. Also, a card sensing switch is provided in the housing, and the installation status of each card type can be sensed.

Another typical example of a card connector is set forth in U.S. Pat. No. 6,642,614. This connector has a connector housing provided with a card holding cavity whose front and top are open; multiple contact terminals that are fitted in the inner part of the card holding cavity; and a covering that covers the top opening of the connector housing; the structure is such that two card types of differing size and thickness can be inserted through the front opening.

According to these connectors, an insertion aperture is formed in the front of the connector housing, two card types of differing size and thickness can be inserted through the insertion aperture, and the cards' contacts are electrically connected to the connector's contact terminals.

However, with each of these card connectors, when assembled it is not possible to examine the internal structure of the card holding cavity, such as the shape of the holding cavity and the contact terminal array status, through the insertion aperture. Hence, a user inserting a card into the insertion aperture will consult the written instructions or procedure, etc., printed on the card and insert the card into the insertion aperture in accordance with such instructions. But such consultation operation is troublesome and annoying, so that sometimes the card will be inserted without performing such consultation; if such insertion is stopped mid-way, the card will be pulled out from the insertion aperture so as to invert its directional or obverse-reverse face orientation, then reinserted for another try. Failure to effect adequate connection via such insertion will entail a further insertion operation with the card turned the other way around, etc. Such connection work will be troublesome and annoying, and what is more, forcibly carrying out such inappropriate insertion could damage or break either the connector or the card. Concerning this, the connector set forth in JP-A-2003-197296 is provided with a sensing switch that senses the card installation status, and is therefore able to sense adequate installation status. But the above trial-and-error connection operations will still have to be carried out until adequate installation is effected, which means that the above problems will remain. Also, the card connector set forth in U.S. Pat. No. 6,642,614, although facilitating formation of the card holding cavity by having the top opening covered by a covering, has the same problems in the assembled state, because the covering is joined to the connector housing by means of bonding agent or the like.

Also, these card connectors are common connectors that are used with cards of differing thickness, which means that the distance between the contacts of the various cards and the connector's contact terminals will vary with the difference in thickness. As a result, when the resilience of the contact terminals has been adjusted to match a thick card, it will not be possible to impart the requisite resilience to the contact terminals with a thin card; and conversely, when the resilience of the contact terminals has been adjusted to match a thin card, then with a thick card the contact terminals will be excessively displaced, exceed their stress limit, and undergo plastic deformation.

Further, where not only the thickness but also the size, that is, the outer dimensions of the cards differs, the card holding cavity is formed to a size that matches large-sized, thick cards. Consequently, when a small-sized, thin card is housed in the card holding cavity, which is suited for a large-sized card, gaps equivalent to the differences in the size and thickness of the two card types will occur inside the card holding cavity. Because of this, the small-sized, thin card will be housed in an unstable condition inside the card holding cavity, and will move readily if some impact acts on the connector, possibly resulting in poor connection between the card and connector, and hence in failure.

SUMMARY

An advantage of some aspects of the present invention is to provide a card connector which permits the interior of the card holding cavity to be examined when a card is housed therein, and into which cards of differing size and thickness can be installed reliably, in a simple manner, and with card misinstallations eliminated.

Another advantage is to provide a card connector from which cards will not accidentally drop out once installed.

Further another advantage is to provide a card connector which eliminates misinstallation of cards.

A card connector according to an aspect of the present invention includes: a connector housing constituted of electrical insulators and capable of housing cards inside a bottomed card holding cavity which is formed therein so as to be enclosed on three sides by an opposed pair of first and second frames and a third frame that links of the end portions of the first and second frames, and so as to be open at the front and top; contact terminals that are deposed inside the connector housing's card holding cavity; and an open-close cover that covers the open portions of the connector housing's card holding cavity; The card connector has the features that: the open-close cover has a sensing member that senses the installation status of the card, and a cover locking mechanism that latches onto either the first or the second frame and locks the open-close cover in the closed state; and the rear of the open-close cover is rotatably pivoted on the first and second frames and moreover is fixed to the first and second frames so as to be horizontally movable; and that after a card is installed inside the card holding cavity, the card's installation status is sensed by closing the open-close cover and positioning the sensing member at the rear end portion of the card, and the open-close cover is retracted, being thereby locked in the closed state via the locking mechanism.

The card holding cavity may be formed in a shape that permits cards of differing size and thickness to be housed therein, the contact terminals that contact with the contacts of such cards being installed inside the card holding cavity.

The card holding cavity may be formed in a shape that permits a first and second card type of differing size and thickness to be housed therein, with the contact terminals including first and second contact terminals that are provided inside the card holding cavity and contact with the contacts of the first and second card types respectively.

Such first contact terminals may be fixed to the third frame of the connector housing, and such second contact terminals be fixed to the bottom of the connector housing.

The open-close cover may be formed from metal plates including a pair of first and second sideplates that cover the outer side surfaces of the first and second frame, a top plate that links the top edges of the sideplates and covers the upper opening of the card holding cavity, and a front cover plate that covers the front opening of the card holding cavity, with the front cover plate serving as the sensing member.

Either the first or the second frame of the connector housing may be provided with a first switch means that senses the installation status of the card, and with a second switch means that senses the open/closed status of the open-close cover.

Such first switch means may be composed of a first fixed contact terminal having a fixed contact, and a first movable contact terminal having a movable contact that contacts and separates from the fixed contact, together with an actuating part that separates the movable contact from the fixed contact when a card is installed; and such second switch means may be composed of a second fixed contact terminal having a fixed contact, and a second movable contact terminal having a movable contact that contacts and separates from the fixed contact, together with an actuating protrusion that separates the movable contact from the fixed contact in interlock with opening/closing manipulation of the open-close cover.

The actuating protrusion of such second movable contact terminal may, in interlock with closing manipulation of the open-close cover, cause the second switch means to execute a series of OFF-ON-OFF operations; in the final OFF state, the actuating protrusion will be latched into a latching hole provided in the frame, thereby locking the open-close cover in the closed state.

The cards may include first and second card types, the first card type being formed long compared to the second card type, and an aperture portion for insertion of the leading end of the first card type being formed in the third frame; so that when a first card type is installed, the leading end of the first card type will be inserted into such aperture and thereby be positioned and secured.

A shield cover made of metal may be fitted onto the rear of the connector housing, the open-close cover may be formed from metal material, and such open-close cover may be pivoted on the shield cover.

Thanks to the above structures, the present invention yields the excellent advantages that will now be described. According to some aspects of the invention, the open-close cover of a card connector is opened when a card is installed, so that, in this opened state, the interior of the card holding cavity can be examined. Thus, when a card is installed, it is possible to check the shape of the card being installed and the position of the contacts thereof with the shape of the card holding cavity and the contact terminal array, and to install the card after such checking, so that the card can be installed in a simple, reliable manner, with misinstallations eliminated. Also, when a card is installed, should the card being installed not be inserted up to the regular position, the sensing member will strike against the trailing end portion of the card so that closing of the cover will not be possible, and incomplete connection of the connector and card will thereby be eliminated. Further, the open-close cover is locked in the closed state by the cover locking mechanism once a card is installed, and therefore will not accidentally open and allow the card to drop out.

According to a preferred mode of the invention, the card holding cavity is formed in a shape that can hold cards of differing size and thickness, and moreover, contact terminals for contacting with the cards' contacts are installed inside the card holding cavity, so that the card connector can be used as a common connector for multiple card types of differing size and thickness.

According to another preferred mode of the invention, the card connector can be used for two card types of differing size and thickness, for example, for micro SD cards and micro MM cards.

According to another preferred mode of the invention, the open-close cover is formed from metal plates including a pair of first and second sideplates that cover the outer side surfaces of the first and second frame, a top plate that links the top edges of the sideplates and covers the upper opening of the card holding cavity, and a front cover plate that covers the front opening of the card holding cavity, with the front cover plate serving as the sensing member; thanks to which, the open-close cover can be manufactured in a simple manner, by punching out plate metal of the requisite thickness and performing metal plate processing thereon. Since the front cover plate serves as the sensing member and the front opening of the card holding cavity will be covered over when the open-close cover is close, entry of dust or the like into the card holding cavity interior will be prevented, and a stable connected state can be maintained. What is more, because it is formed of metal plates, the open-close cover will, when installed to the connector housing, electromagnetically shield the connector.

According to another preferred mode of the invention, thanks to a first switch means, whether or not a card has been installed in the regular state can be sensed in a simple manner, and thanks to a second switch means, the open/closed status of the open-close cover can be sensed; as a result, it is possible to proactively prevent incomplete installation of the card and incomplete closing of the open-close cover.

According to another preferred mode of the invention, thanks to a second switch means, the open/closed status of the open-close cover can be sensed, and moreover, the open-close cover can be locked.

According to another preferred mode of the invention, when a first card type is installed, the leading end of the first card type will be inserted into an aperture portion formed in the third frame and thereby be positioned and secured. Thus, the first card type will be accurately positioned and secured inside the card holding cavity.

According to another preferred mode of the invention, the connector housing is covered by a metallic shield cover and open-close cover, so that the connector is electromagnetically shielded in a simple manner. Further, by pivoting the open-close cover on the shield cover, assembly of the connector is rendered simple.

BRIEF DESCRIPTION OF THE DRAWINGS

The invention will be described with reference to the accompanying drawings, wherein like numerals reference like elements.

DESCRIPTION OF EXEMPLARY EMBODIMENT

An exemplary embodiment of the present invention will now be described with reference to the accompanying drawings. It should be borne in mind however, that the following embodiment is merely an example of a card connector that realizes the technical concepts of the invention. The embodiment is not intended to limit the invention to this particular card connector. The invention can equally well be adapted to yield other embodiments contained within the scope of the claims.

First Embodiment

Figure 1:
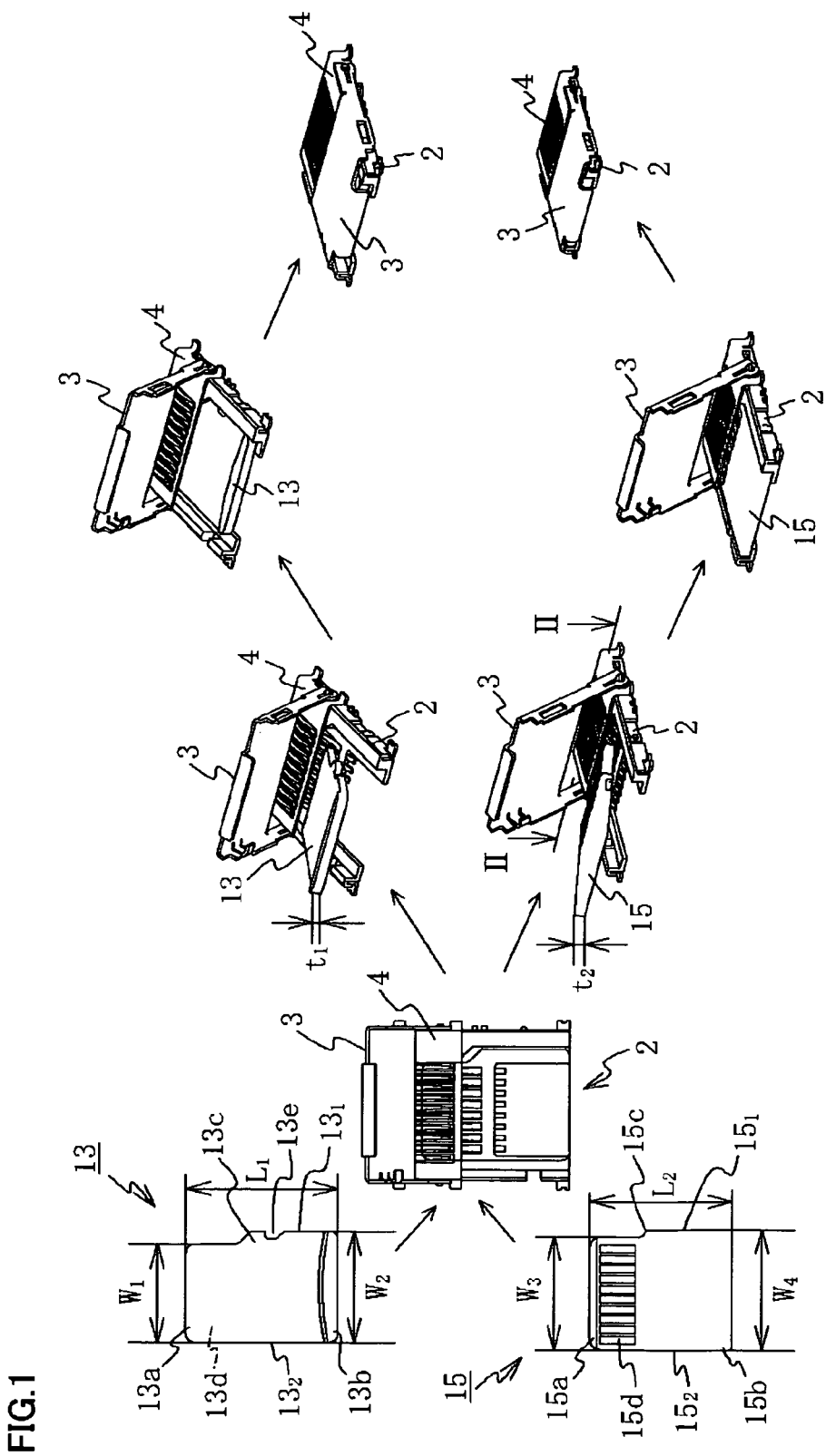
FIG. 1 is a general view of a card connector of an embodiment of the present invention, illustrating the mode of use thereof.
Figure 2:
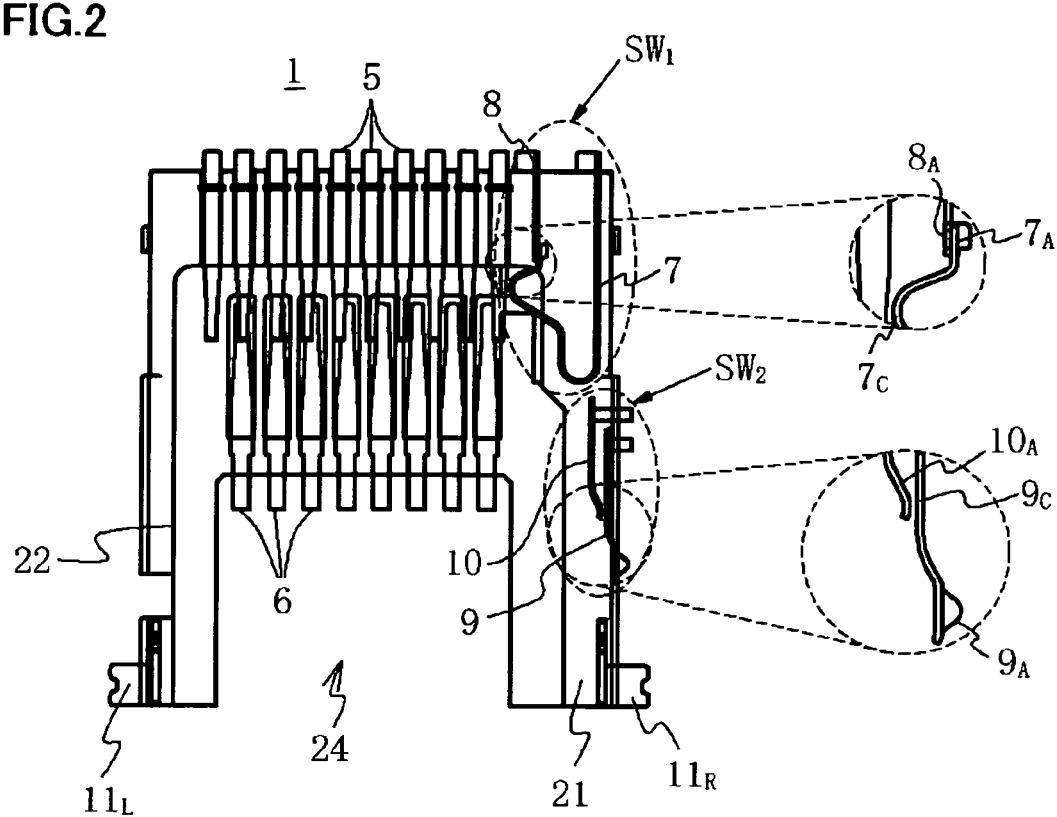
FIG. 2 is a cross-sectional view of the card connector in FIG. 1, along line II-II therein.

As shown in FIG. 1, a card connector (below, "connector") 1 is used with two types of card, a first type and a second type, that differ slightly in size and thickness, for instance a micro SD (super density) card 13 and a micro MM (multi media) card 15. Accordingly, outline descriptions of these cards will first be given.

The micro SD card 13 includes a rectangular plate-like body having longitudinal length $L_1$, widths $W_1$ and $W_2$ at the forward and rear end portions 13a and 13b ($W_1<W_2$), and thickness $t_1$. The interior thereof contains an IC chip, while the outer periphery is formed from a molding of electrically insulative synthetic resin. On one of the side edges (the first side edge) $13_1$ of this micro SD card 13 there are provided a positioning protrusion 13c and a latching indent 13e, while the other side edge $13_2$ is a straight line. On the obverse face of the micro SD card 13 there are provided multiple contacts 13d that are connected to the IC chip in the interior.

The micro MM card 15 has almost the same shape as the micro SD card 13, including a molding having longitudinal length $L_2$, widths $W_3$ and $W_4$ at the forward and rear end portions 15a and 15b ($W_3<W_4$), and thickness $t_2$. The micro MM card 15 too has a positioning protrusion 15c provided in one of the side edges (the first side edge) $15_1$, the other side edge (the second side edge) $15_2$ being a straight line, and has multiple contacts 15d provided on its obverse face. Moreover, the contacts 13d of the micro SD card 13 are provided on the reverse side of the micro SD card 13 shown in FIG. 1. The latching indent 13e is for installation of a guide member or the like, which is not shown in the drawings. The relations between the widths, lengths and thicknesses of these micro SD and micro MM cards 13, 15 are: $W_3>W_1$, $L_1>L_2$, and $t_2>t_1$.

The connector 1 has: a connector housing (below, the "housing") 2 with a card holding cavity 24 in which the micro SD or micro MM card 13, 15 are installed; first and second contact terminals 5, 6 that are housed in the housing 2 and are electrically connected to the contacts 13d, 15d of the respective card; and an open-close cover 3 and shield cover 4 which are mounted on top of the housing 2.

There follow descriptions of the structures of the housing 2, the open-close cover 3, the shield cover 4, and the first and second contact terminals 5, 6.

FIGS. 3 and 4 give perspective views of the housing 2 seen from different angles, to facilitate comprehension of the structure of the housing 2. The housing 2 is formed as an electrically insulative synthetic resin molding, which is surrounded by an opposed pair of first and second frames 21, 22 and a third frame 23 that links the end portions of the first and second frames 21, 22, and which has a shallow-bottomed card holding cavity 24 that is open on three sides-the front, the top, and part of the bottom. The upper surface of the housing 2 is partitioned, part-way along from the front end toward the rear, into two: an open-close cover mounting part i toward the front, that is covered by the open-close cover 3, and a shield cover mounting part ii toward the rear, where the shield cover 4 is mounted.

The pair of first and second frames 21, 22 are provided so as to have a spacing therebetween slightly larger than the larger width $W_4$ of the micro MM card 15, have a length slightly longer than the length $L_1$ of the longer micro SD card 13, and are formed as square pillar-like bodies of a particular thickness. More precisely, as shown in FIGS. 3B and 4A, the first frame 21 is formed as a square-pillar body having obverse and reverse wall faces $21_A$, $21_B$ and inner and outer wall faces $21_C$, $21_D$. Likewise, the second frame 22 is formed as a square-pillar body having obverse and reverse wall faces $22_A$, $22_B$ and inner and outer wall faces $22_C$, $22_D$. Further, the third frame 23 too is formed as a square-pillar body of a particular thickness, which has obverse and reverse wall faces $23_A$, $23_B$ and inner and outer wall faces $23_C$, $23_D$.

Figure 3A:
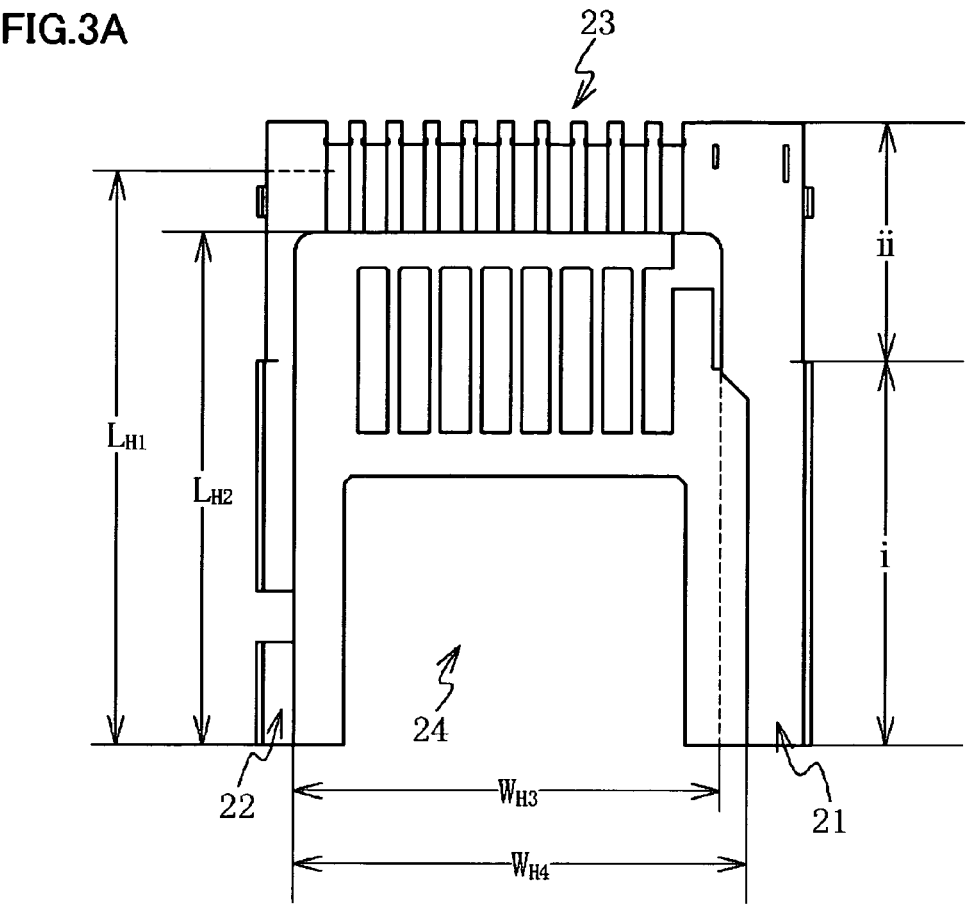
FIG. 3 illustrates the connector housing, FIG. 3A being a plan view, and FIG. 3B a perspective view.
Figure 3B:
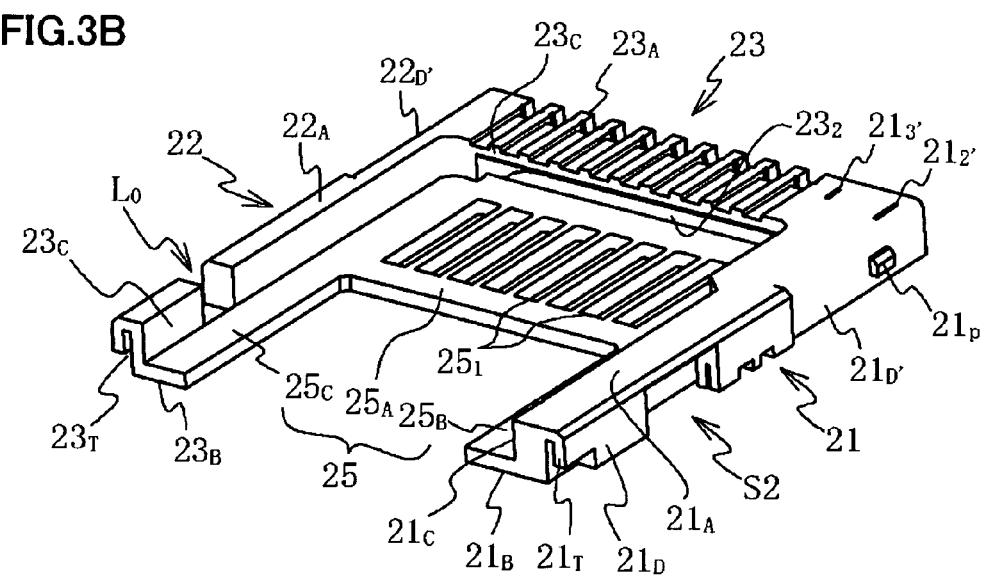
Figure 4A:
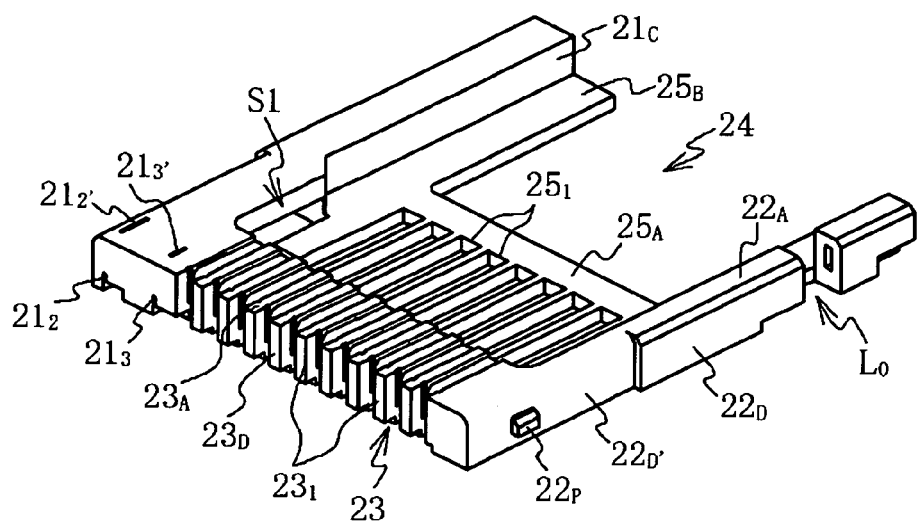
FIG. 4 illustrates the connector housing, FIG. 4A being a perspective view of the housing in FIG. 3B from another angle, and FIG. 4B being a rear view.
Figure 4B:
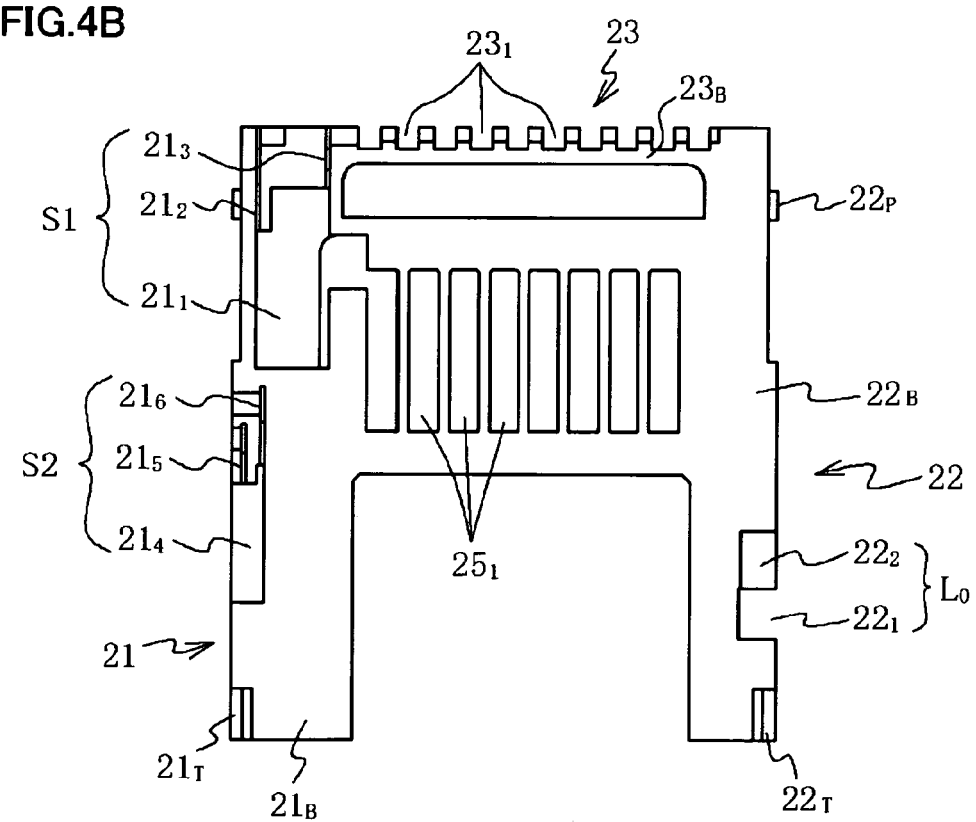

The first frame 21 is a little thicker than the second frame 22, and as shown in FIGS. 3B and 4B, is provided with first and second switch mounting portions S1, S2 at two locations, toward the front and the rear. A switch member for sensing the installation status of the micro SD and micro MM cards 13, 15 is fitted into the first switch mounting portion S1, and a switch member for sensing the open-closed status of the open-close cover 3 is fitted into the second switch mounting portion S2.

The first switch mounting portion S1 is composed, as shown in FIG. 4B, of a square-bottomed depression $21_1$ that is cut out, at a particular depth, from the reverse wall face $21_B$ toward the obverse wall face $21_A$ of the first frame 21; and two mounting slots $21_2$, $21_3$ that communicate with the square-bottomed depression $21_1$, these being provided in the vicinity of the third frame 23. The mounting slot $21_2$ is formed in the reverse wall face $21_B$ of the first frame 21, and has a width that allows insertion of a movable contact terminal 7 to be described later. In the obverse wall face $21_A$ of the first frame 21 there is formed an insertion slot $21_2$' into which the fitting tab $7_E$ of the movable contact terminal 7 is inserted (see FIG. 4A). Also, the mounting slot $21_3$ is formed in the reverse wall face $21_B$ of the first frame 21 and has a width that allows insertion of a fixed contact terminal 8 to be described later.

The second switch mounting portion S2 is formed, as shown in FIG. 4B, with a square-bottomed depression $21_4$ that sinks to a particular depth from the outer wall face $21_D$ of the first frame 21; and two mounting slots $21_5$, $21_6$ that communicate with the square-bottomed depression $21_4$. A switch member for sensing the open/closed status of the open-close cover 3 is fitted into the second switch mounting portion S2. Further, the front portion of the outer wall face $21_D$ of the first frame 21 bulges outward, while the rear portion thereof that is close to the third frame 23 includes a flat surface $21_{D'}$ that lies beyond a step difference, being recessed relative to the front portion, and in such flat surface $21_{D'}$ there is formed a latching protrusion $21_P$ onto which the shield cover 4 latches.

As shown in FIGS. 3A and 3B, there is a particular width dimension $W_{H4}$ between the front portion of the inner wall face $21_C$ of the first frame 21 and the inner wall face $22_C$ of the second frame 22, which is opposed to the inner wall face $21_C$. Near to the first switch mounting portion S1 there is formed an inclined face $21_{C'}$, and the portion to the rear of such inclined face $21_{C'}$ (that is, the inmost portion) projects into the card holding cavity 24, SO that at the inmost portion the distance between the inner wall face $21_C$ and the inner wall face $22_C$ of the second frame 22 is contracted, becoming width dimension $W_{H3}$. If the micro SD or micro MM card 13 or 15 is installed wrongly, the positioning protrusion 13c or 15c of the micro SD or micro MM card 13 or 15 will strike against the inclined face $21_C$, blocking any further pushing-in of the card, so that wrong installation is prevented. Conversely, when the micro SD or micro MM card 13 or 15 is installed correctly, the inclined face $21_C$ will serve as a guide surface that renders the pushing-in smooth. In the front portion of the reverse wall face $21_B$ of the first frame 21 there is formed a mounting slot $21_T$ into which a fitting tab is fitted.

As shown in FIG. 3B, the front portion of the outer wall face $22_D$ of the second frame 22 bulges outward, while the rear portion thereof that is close to the third frame 23 includes a flat surface $22_{D'}$ that lies beyond a step difference, being recessed relative to the front portion, and in such flat surface $22_{D'}$ there is formed a latching protrusion $22_P$ onto which the shield cover 4 latches. In the front portion of the outer wall face $22_D$ of there is formed a mounting slot $22_T$ into which a fitting tab fits.

Further, at the front of the second frame 22 there is formed a latching portion $L_0$ for locking the open-close cover 3. The latching portion $L_0$ is composed, as shown in FIGS. 3B and 4, of an incised slot $22_1$ that is cut out with a particular width in the second frame 22, and a latching slot $22_2$ that is formed in the reverse wall face $22_B$ so as to communicate with the incised slot $22_1$.

In the obverse wall face $23_A$ and outer wall face $23_D$ of the third frame 23 there are formed, with roughly equal spacings, multiple mounting slots $23_1$ of a width that allows installation of the first contact terminals 5, as shown in FIG. 4A. Also, in the inner wall face 23c there is formed an aperture $23_2$ of a size that allows insertion of the leading end portion 13a of the narrow micro SD card 13 (see FIG. 3B). More precisely, so as to be of a size that allows the leading end portion 13a of the micro SD card 13 to be inserted, the aperture $23_2$ is formed with a longitudinal dimension a little larger than the width $W_1$ of the micro SD card 13 and with a height a little larger than the thickness $t_1$ of the micro SD card 13, so that when the leading end portion 13a of the micro SD card 13 is inserted into the aperture, positioning and securing of this card is effected.

As shown in FIGS. 3 and 4A, the first and second frames 21, 22 are coupled via a bottom plate 25 extending from the third frame 23 toward the front portions of the first and second frames 21, 22. More precisely, the reverse wall faces $21_B$, $22_B$ of the first and second frames 21, 22 are coupled via a bottom plate 25 of a particular thickness. This bottom plate 25 is formed as an inner bottom plate $25_A$ that couples the two frames 21, 22, plus lateral bottom plates $25_B$, $25_C$ that are drawn out from the inner bottom plate $25_A$ and divided along the first and second frames 21, 22. In the inner bottom plate $25_A$ there are formed, with roughly equal spacings, multiple mounting slots $25_1$ into which the second contact terminals 6 are installed.

Thus, the card holding cavity 24 is formed by being surrounded on three sides by the first and second frames 21, 22 plus the third frame 23. As shown in FIG. 3A, the distance $W_{H4}$ between the inner wall faces $21_C$, $22_C$ of the first and second frames 21, 22, and the distance $W_{H3}$ between the inner wall face $22_C$ and the inclined face $21_C$, are formed to be a little larger than the widths $W_4$, $W_3$ of the micro MM card 15, so that the broad micro MM card 15 can be inserted. Also, the length $L_{H1}$ from the leading end portion to the interior of the aperture $23_2$ is formed to be almost equal to the length $L_1$ of the micro SD card 13, SO that the micro SD card 13 can be inserted. Furthermore, the length $L_{H2}$ from the leading end portion to the inner wall face $23_C$ of the third frame 23 is formed to be almost equal to the length $L_2$ of the micro MM card 15.

Figure 5A:
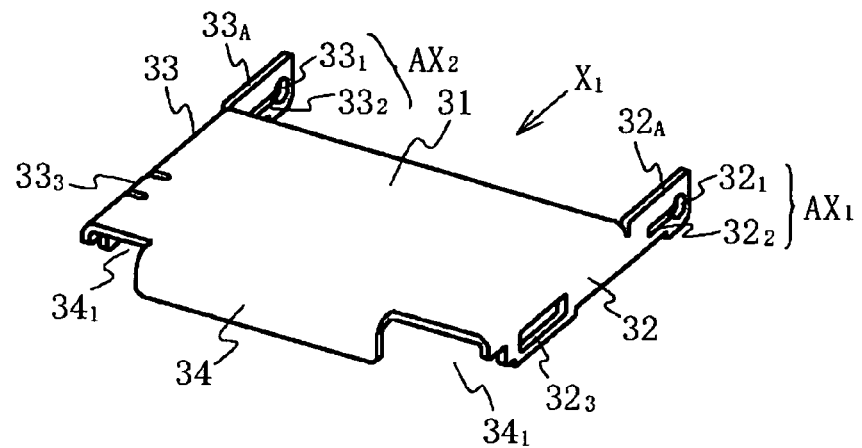
FIG. 5 is a perspective view of the open-close cover.
Figure 5B:
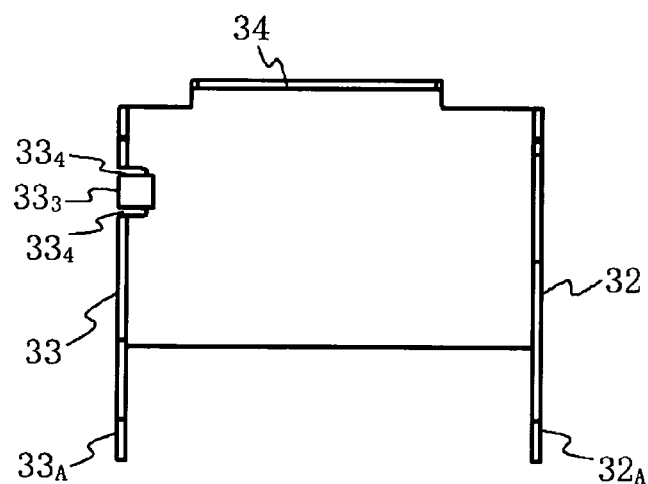
Figure 5C:
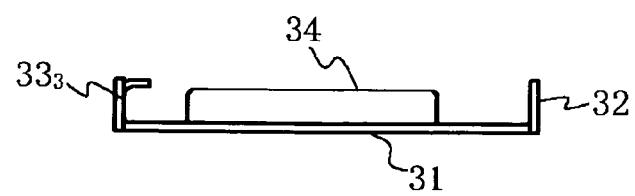

The open-close cover 3, which is for covering the card holding cavity 24 of the housing 2, has, as FIG. 5 shows, a top plate 31 that covers the top opening of the card holding cavity 24; a pair of sideplates 32, 33 that are bent downward from the two side edges of the top plate 31 and cover the sidewall faces of the housing 2; and a front cover plate 34 that similarly is bent downward from the front edge of the top plate 31 and covers the front opening of the card holding cavity 24; and is formed via punching of metal plate and bending processing. Between the two sideplates 32, 33 and the front cover plate 34 there are formed gaps $34_1$, $34_1$. The pair of sideplates 32, 33 are extended a certain distance rearward, and in these extension portions $32_A$, $33_A$ there are provided pivoting parts $AX_1$, $AX_2$. The pivoting part $AX_1$ is composed of a pivoting hole $32_1$ in which the pivot protrusion $42_1$ of the shield cover 4 to be described later pivots, and a latching slit $32_2$ into which the pivot protrusion $42_1$ latches. The other pivoting part $AX_2$ has a pivoting hole $33_1$ and a latching slit $33_2$ of the same structure as those of the pivoting part $AX_1$.

Also, in one sideplate 32, near the front, there is formed a mating hole $32_3$. This mating hole $32_3$ is of a size that allows insertion and latching of the latching protrusion $9_A$ of the switch member 9. Further, in the other sideplate 33, near the front, there is formed a latching tab $33_3$ that latches into the latching portion $L_0$ of the second frame 22. This latching tab $33_3$ is sectioned off by two incised slits $33_4$, $33_4$ formed in a portion of the sideplate 33, and is formed in a hook shape by bending a portion of the bottom edge of the sideplate 33 over toward the opposed other sideplate 32 (see FIGS. 5B and 5C). The latching tab 33$_3$ latches into the latching portion L$_0$ and locks the open-close cover 3 in the closed state. The pivoting parts AX$_1$, AX$_2$ and the latching tab 33$_3$ constitute the locking mechanism. The extension portions 32$_A$, 33$_A$ possess resilience and, during installation of the open-close cover 3 to the housing 2, will press against and be clasped by the sideplates 42, 43 of the shield cover 4 that is fitted to the housing 2. The open-close cover 3 is formed from metallic material, and therefore when installed to the housing 2 will act as an electromagnetic shielding member that shields the connector 1.

Figure 6:
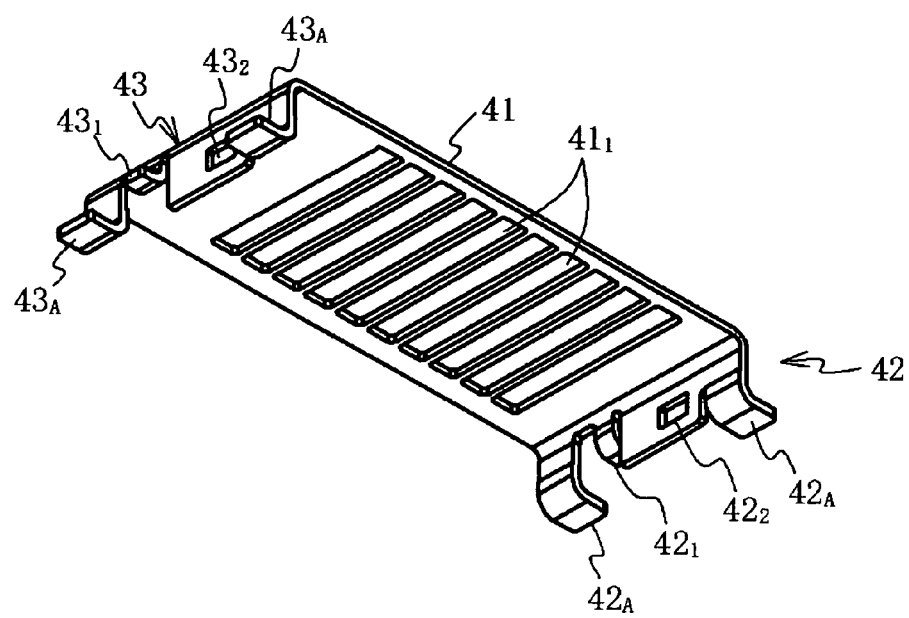
FIG. 6 is a perspective view of the shield cover.

The shield cover 4, which as FIG. 6 shows, is an item that is fitted to the shield cover mounting part ii of the housing 2, has a top plate 41 that covers over such mounting part, and a pair of sideplates 42, 43 that are bent downward from the two ends of the top plate 41; and is formed via punching of metal plate and bending processing. Multiple slits 41$_1$ are formed with roughly equal spacings in the top plate 41. Such spacings correspond to the first contact terminals 5 that are installed in the housing 2, and the width of the slits 41$_1$ is a dimension such that the first contact terminals 5 and the shield cover 4 will not contact.

Now the structure of the sideplates 42, 43 will be described. Since the sideplates 42, 43 have the same form, the form of one only, the sideplate 42, will be described. In the sideplate 42 there are formed a latching hole 42$_2$ into which the latching protrusion 21$_P$ of the housing 2 latches, a pivot protrusion 42$_1$ that pivots in the pivot part AX$_1$ of the open-close cover 3, and a pair of fitting tabs 42$_A$, 42$_A$ that fit into a circuit board such as a printed wiring board. The other sideplate 43 is likewise provided with a similar latching hole 43$_2$, pivot protrusion 43$_1$ and a pair of fitting tabs 43$_A$, 43$_A$. The sideplates 42, 43 possess resilience and, during installation of the open-close cover 3 to the housing 2, will press against and be clasped by the flat surfaces 21$_{D'}$, 22$_{D'}$ in the sidewall faces 21$_D$, 22$_D$ of the housing 2. Also, due to being formed from metallic material, when installed to the housing 2 the shield cover 4 will act as an electromagnetic shielding member that shields off external noise.

Figure 7A:
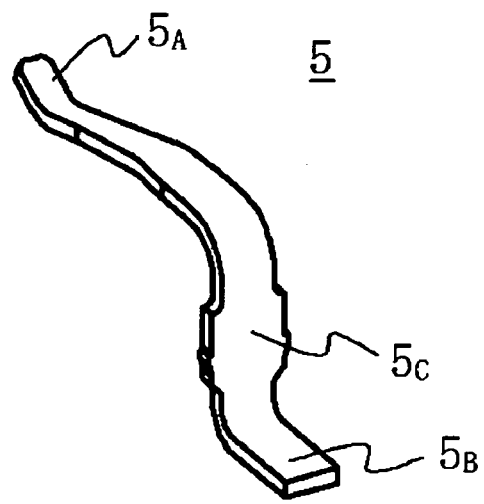
FIG. 7 illustrates a pair of contact terminals, FIG. 7A being a perspective view of a first contact terminal, and FIG. 7B being a perspective view of a second contact terminal.
Figure 7B:
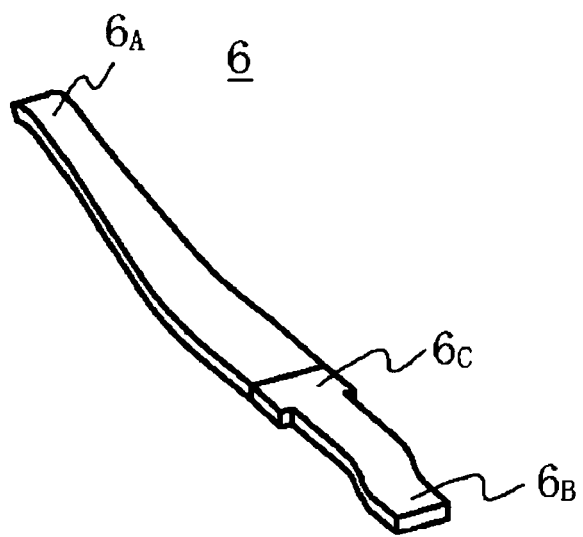

FIG. 7 shows the first and second contact terminals 5 and 6. The first contact terminal 5 has at one end a contact 5$_A$ that contacts with the contacts 15$d$ of the micro MM card 15; at the other end a connecting portion 5$_B$ that is connected by soldering to a lead wire; and, provided in the vicinity of the connecting portion 5$_B$, a fixing portion 5$_C$ for fixing to the housing 2; and is formed as a highly conductive, resilient strip-like metal piece of a particular width, length and thickness. The first contact terminal 5 is fitted to the third frame 23 of the housing 2, and electrically connected to the contacts 15$d$ of the micro MM card 15. The second contact terminal 6 has at one end a contact 6$_A$ that is electrically connected to the contacts 13$d$ of the micro SD card 13; at the other end a connecting portion 6$_B$ that is connected by soldering to a lead wire; and, provided in the vicinity of the connecting portion 6$_B$, a fixing portion 6$_C$ for fixing to the housing 2; and is formed as a highly conductive, resilient strip-like metal piece of a particular width, length and thickness. The second contact terminal 6 is fitted to the inner bottom plate 25$_A$ of the housing 2, and connected to the contacts 13$d$ of the micro SD card 13.

Figure 8A:
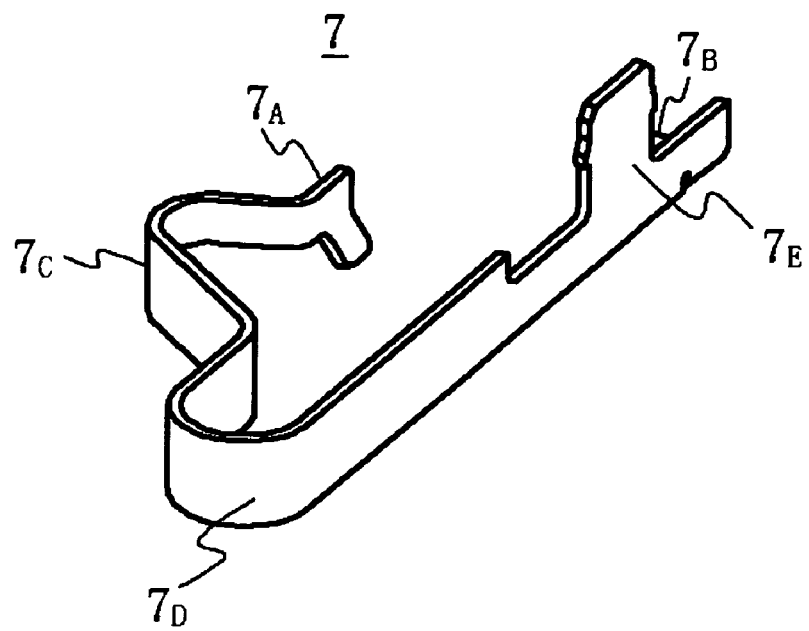
FIG. 8 illustrates a first switch member, FIG. 8A being a perspective view of a movable contact terminal, and FIG. 8B being a perspective view of a fixed contact terminal.
Figure 8B:
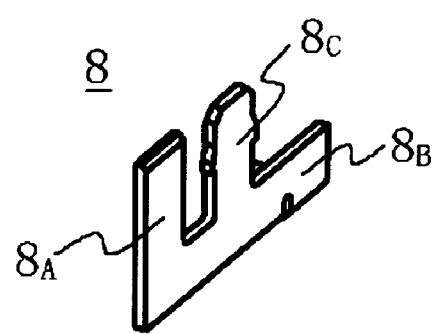

FIG. 8 shows the first switch member that constitutes the first switch means SW$_1$. This first switch means SW$_1$ is composed of a movable contact terminal 7 with a movable contact, and a fixed contact terminal 8 with a fixed contact. The movable contact terminal 7 has a movable contact 7$_A$ provided at the front tip; a projecting curved portion 7$_C$ that is provided at a point somewhat removed from such contact and contacts against the first side edge 13$_1$ or 15$_1$ of the card 13 or 15; a curved portion 7$_D$ that imparts resilience to the movable contact 7$_A$ and projecting curved portion 7$_C$; a connecting portion 7$_B$ that is provided at the rear tip and is connected by soldering to a lead wire; and, provided in the vicinity of the connecting portion 7$_B$, a fitting tab 7$_E$ that is fixed to the housing 2; and is formed as a highly conductive, resilient strip-like metal piece of a particular width, length and thickness. The projecting curved portion 7$_C$ serves as the actuating part for the first switch means SW$_1$. The fixed contact terminal 8 has a fixed contact 8$_A$ provided at the front tip; a connecting portion 8$_B$ that is provided at the rear tip and is connected by soldering to a lead wire; and, provided in the vicinity of the connecting portion 8$_B$, a fitting tab 8$_C$ that is fixed to the housing 2; and is formed as a highly conductive, resilient strip-like metal piece of a particular width, length and thickness.

Figure 9A:
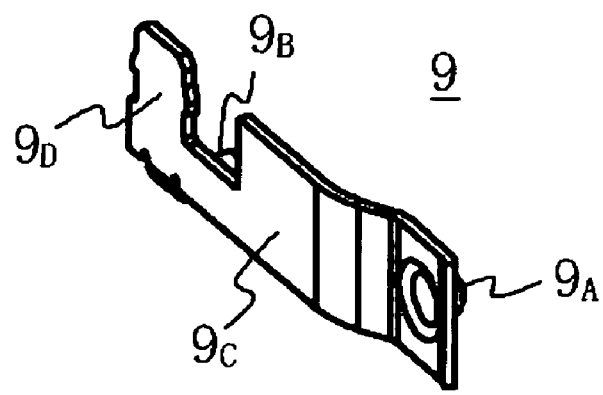
FIG. 9 illustrates a second switch member, FIG. 9A being a perspective view of a movable contact terminal, and FIG. 9B being a perspective view of a fixed contact terminal.
Figure 9B:
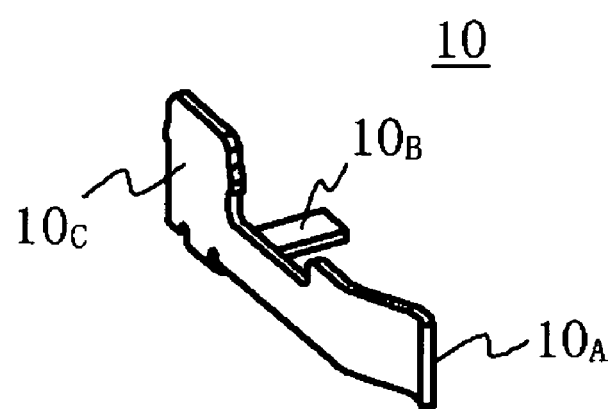

FIG. 9 shows the second switch member that constitutes the second switch means SW$_2$. This second switch means SW$_2$ is composed of a movable contact terminal 9 with a movable contact, and a fixed contact terminal 10 with a fixed contact. The movable contact terminal 9 has a latching protrusion 9$_A$ provided at the front tip; a movable contact 9$_C$ provided in the vicinity of the latching protrusion 9$_A$; a connecting portion 9$_B$ that is connected by soldering to a lead wire; and, provided in the vicinity of the connecting portion 9$_B$, a fitting tab 9$_D$ that is fixed to the housing 2; and is formed as a highly conductive, resilient strip-like metal piece of a particular width, length and thickness. The latching protrusion 9$_A$ contacts against the inner face of the sideplate 32 of the open-close cover 3, and performs the function of causing the movable contact 9$_C$ of the movable contact terminal 9 to contact with the fixed contact 10$_A$ of the fixed contact terminal 10, as well as that of locking the open-close cover 3. The fixed contact terminal 10 has a fixed contact 10$_A$ provided at the front tip; a connecting portion 10$_C$ that is connected by soldering to a lead wire; and, provided in the vicinity of the connecting portion 10$_C$, a fitting tab 10$_B$ that is fixed to the housing 2; and is formed as a highly conductive, resilient strip-like metal piece of a particular width, length and thickness.

Figure 10A:
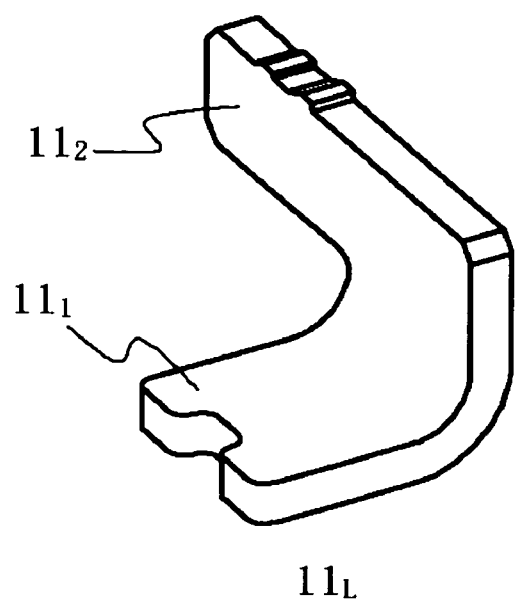
FIG. 10 illustrates fitting tabs, FIG. 10A being a perspective view of a left fitting tab, and FIG. 10B being a perspective view of a right fitting tab.
Figure 10B:
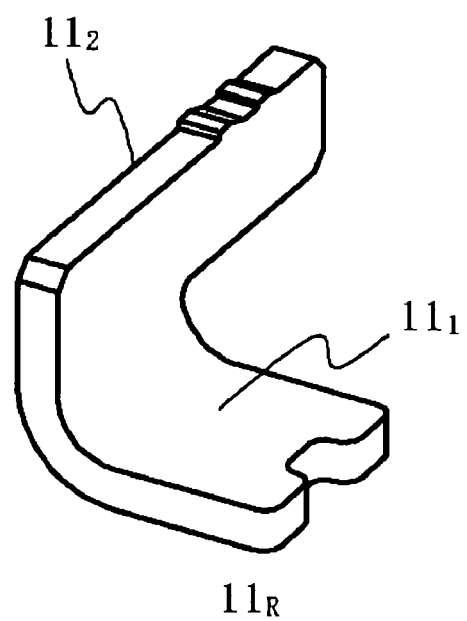

FIG. 10 shows a pair of fitting tabs. These fitting tabs includes a left and a right fitting tab, 11$_L$ and 11$_R$, are mounted to the bottom of the housing 2, and are for fixing the connector 1 to a circuit board such as a printed wiring board. The left fitting tab 11$_L$ has a housing fixing portion 11$_1$ that is inserted into installation holes in the housing 2, and a circuit board fixing portion 11$_2$ that is drawn out from one end of the housing fixing portion 11$_1$ and is fixed to the circuit board by solder; and is formed as an approximately L-shaped metallic piece. The other, right fitting tab 11$_R$ likewise has a housing fixing portion 11$_1$ and a circuit board fixing portion 11$_2$. However, the left and right fitting tabs 11$_L$, 11$_R$ differ in the direction in which the circuit board fixing portion 11$_2$ is drawn out relative to the housing fixing portion 11$_1$.

Next will be described, with reference to FIGS. 1 to 14, the procedure for assembling a connector 1 that employs the foregoing parts. First, the first and second contact terminals 5, 6 shown in FIG. 7 are fitted to the housing 2 shown in FIGS. 3 and 4. The first contact terminals 5 are fitted by press-fitting and securing the fixing portions 5$c$ thereof into the mounting slots 23$_1$ in the third frame 23 of the housing 2. As a result of such fitting, the contacts 5$_A$ of the first contact terminals 5 will be positioned inside the card housing cavity 24, while the connecting portions 5$_B$ thereof will be in a state such as to project to the rear of the third frame 23, as shown in FIG. 14B. The second contact terminals 6 are fitted into the mounting slots $25_1$ in the inner bottom plate $25_A$. The second contact terminals 6 are fitted by passing the fixing portions $6_C$ thereof along the back surface of the inner bottom plate $25_A$, and insert-molding the fixing portions $6_C$ through the mounting slots $25_1$ so as to point upward and be secured. As a result of such fitting, the contacts $6_A$ of the second contact terminals 6 will be positioned inside the card housing cavity 24, while the connecting portions $6_B$ thereof will be in a state such as to project to the lower surface of the inner bottom plate $25_A$, as shown in FIG. 14B.

Following that, the first and second switch members shown in FIGS. 8 and 9 are fitted to the first and second switch mounting portions S1, S2 of the housing 2. To fit the first switch member to the first switch mounting portion S1, the movable contact terminal 7 and the fixed contact terminal 8 are inserted into and fixed in mounting slot $21_2$ and mounting slot $21_3$ respectively. Likewise, to fit the second switch member to the second switch mounting portion S2, the movable contact terminal 9 and the fixed contact terminal 10 are inserted into and fixed in mounting slot $21_5$ and mounting slot $21_6$ respectively. Such fitting of the first and second switch members to the first and second switch mounting portions S1, S2 results in the formation of the first and second switch means $SW_1$ and $SW_2$ shown in FIG. 2. More precisely, the first switch means $SW_1$, is formed when the movable contact $7_A$ of the movable contact terminal 7 contacts with the fixed contact $8_A$ of the fixed contact terminal 8, and the projecting curved portion $7_C$ projects inside the card holding cavity 24; while the second switch means $SW_2$, is formed when the movable contact $9_C$ of the movable contact terminal 9 faces, but is separated, i.e. disconnected from, the fixed contact $10_A$ of the fixed contact terminal 10, and the latching protrusion $9_A$ projects outward.

Next, the shield cover 4 shown in FIG. 6 is fitted to the shield cover mounting part ii at the rear of the housing 2. The shield cover 4 is fitted by pushing outward the two opposed sideplates 42, 42, against the resilience thereof, so that the distance therebetween is widened; bringing the two sideplates into contact with the sidewalls $21_D$, $22_D$ of the housing 2, and mating the mating holes $42_2$, $43_2$ of the two sideplates 42, 43 to the latching protrusions $21_P$, $22_P$ on the housing 2, so as to effect fixing. After that, the open-close cover 3 shown in FIG. 5 is fitted to the shield cover 4. To fit the open-close cover 3, the extension portions $32_A$, $33_A$ of the two sideplates of the open-close cover 3 are pushed outward, against the resilience of the two sideplates, and the pivoting holes $32_1$, $33_1$ provided in the extension portions $32_A$, $33_A$ are fitted onto the pivot protrusions $42_1$ $43_1$ in the shield cover 4 so that the open-close cover 3 is mounted rotatably thereto. With the open-close cover 3 thus fitted to the housing 2, the open-close cover 3 can be opened/closed as desired, and when the open-close cover 3 is open, it is possible to examine the interior of the card holding cavity 24, as shown in FIG. 11. After that, the left and right fitting tabs $11_L$, $11_R$ shown in FIG. 11 are fitted into the mounting slots $21_T$, $22_T$ in the bottom of the housing 2, whereupon assembly of the connector 1 is complete. The assembled connector 1 is used by being fitted to a printed wiring board or the like, which is not shown in the drawings.

Next will be described, with reference to FIGS. 1, 2, 11 to 14, the installation of the micro SD and micro MM cards 13, 15 into the card holding cavity 24, and the process of closing the open-close cover 3. First, installation of one of these card types, the micro MM card 15, into the card holding cavity 24 will be described below.

To begin with, before installation of the micro MM card 15, the open-close cover 3 is opened. Opening the open-close cover 3 exposes the interior of the card holding cavity 24, so that the interior is observable. At this point, a check is made by comparing the contacts 15d and positioning protrusion 15c of the micro MM card 15 to be inserted with the array status and hole shapes of the first contact terminals 5 inside the card holding cavity 24. Based on the result of such check, the micro MM card 15 shown in FIG. 1 is oriented with the contacts 15d on the upward face. Should the obverse and reverse faces of the micro MM card 15 be the wrong way around, they will be changed so that the contacts 15d point upward.

Next, the micro MM card 15's first side edge $15_1$, where the positioning protrusion 15c is provided, and reverse face, are brought into contact with the inner wall face $21_C$ of the first frame 21 and the lateral bottom plate $25_B$ of the card holding cavity 24, respectively, while at the same time the second side edge $15_2$ is brought into contact with the lateral bottom plate $25_C$ and inner wall face $22_C$ of the second frame 22, and the card is inserted. In such insertion process, as the micro MM card 15's leading end portion 15a approaches the aperture $23_2$, the micro MM card 15's first side edge $15_1$, contacts against the projecting curved portion $7_C$ of the movable contact terminal 7 and is pushed outward, the movable contact $7_A$ of the movable contact terminal 7 becomes detached from the fixed contact $8_A$ of the fixed contact terminal 8, and the first switch means $SW_1$ is turned OFF. The fact that the micro MM card 15 has been installed can be sensed electrically via such turning OFF of the first switch means $SW_1$ (see FIG. 2). Thus, when installing the card, it is possible, before insertion, to make a check by comparing the contacts 15d and positioning protrusion 15c of the micro MM card 15 to be inserted with the array status and hole shapes of the first contact terminals 5 inside the card holding cavity 24; so that the card can be installed in an extremely simple manner without any misinstallation.

Figure 11A:
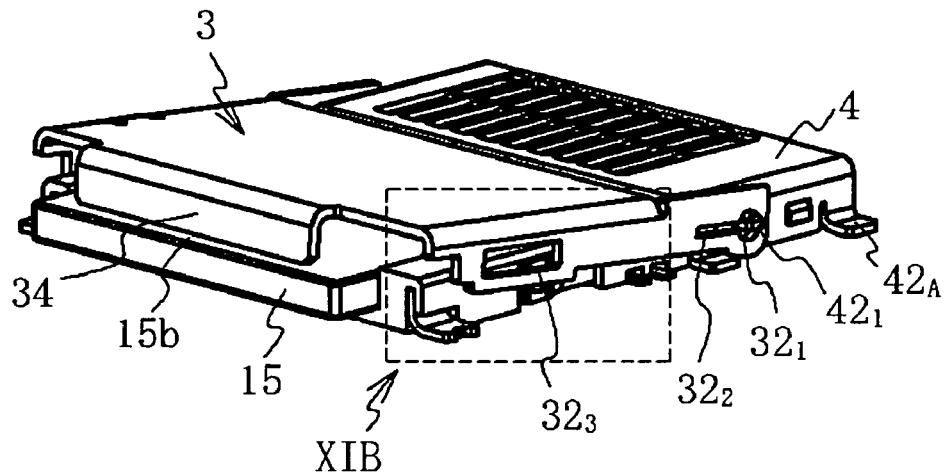
FIG. 11 explicates the closing manipulation of the open-close cover, FIG. 11A being a perspective view, and FIG. 11B being side views of portion XIB in FIG. 11A.
Figure 11B:
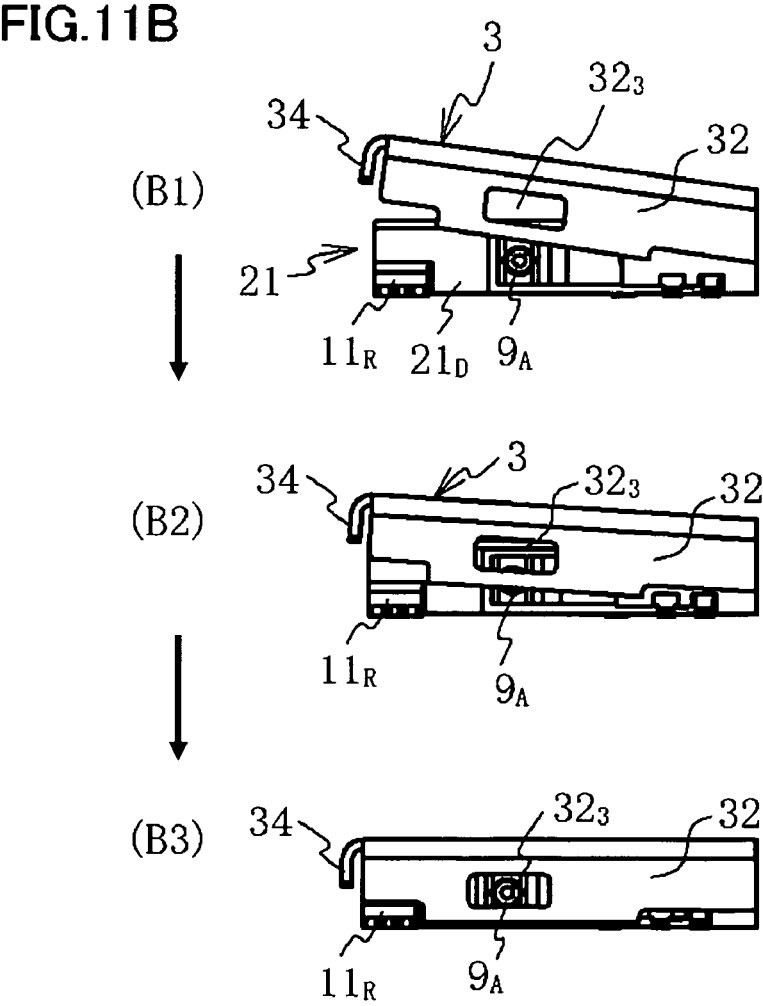
Figure 12A:
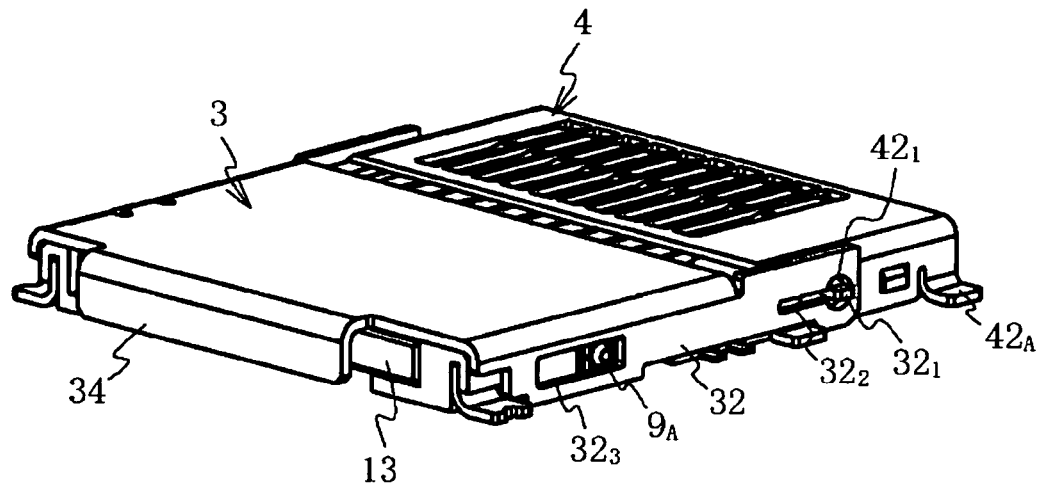
FIG. 12 illustrates the state where a card is installed, FIG. 12A being a perspective view of the state where a micro SD card is installed, and FIG. 12B being a perspective view of the state where a micro MM card is installed.
Figure 12B:
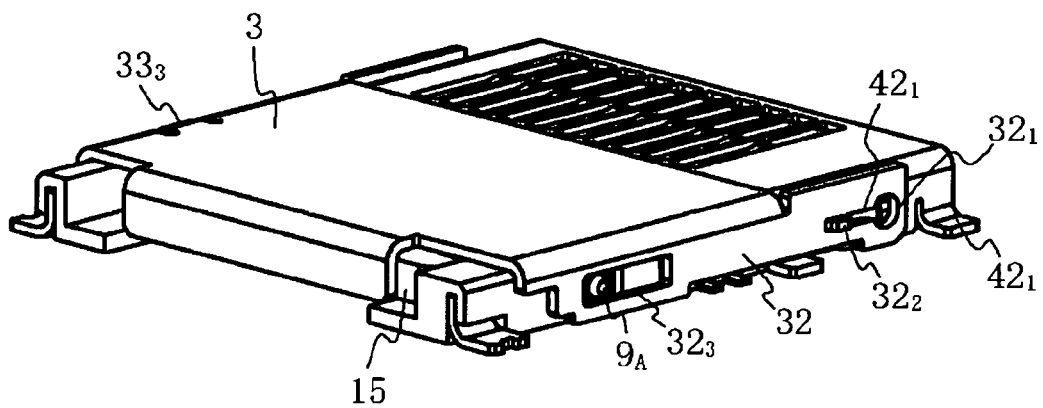

After the micro MM card 15 has been inserted into the card holding cavity 24, the open-close cover 3 is closed. If the micro MM card 15 has not been inserted up to the correct position at the time of such closing manipulation, the trailing end portion 15b of the micro MM card 15 will spring out to the exterior through the front opening of the card holding cavity 24, as shown in FIG. 11A. As a result, the front cover plate 34 of the open-close cover 3 will strike against the sprung-out portion and it will not be possible to close the open-close cover 3. Hence, incomplete installation of the micro MM card 15 can be sensed in a simple manner via such colliding of the open-close cover 3 with the micro MM card 15. Subsequently, when the micro MM card 15 is inserted up to the regular position, it becomes possible to close the open-close cover 3, and the open-close cover 3 is closed. With open-close cover 3 closed, the front cover plate 34 covers the front opening, so that entry of dust or other foreign matter is prevented. FIG. 12A shows the state where a micro SD card 13 is installed, and FIG. 12B the state where a micro MM card 15 is installed.

In tandem with the open-close cover 3 closing manipulation, the second switch means $SW_2$ executes a series of OFF-ON-OFF operations. More precisely, prior to closing of the open-close cover 3, the second switch means $SW_2$ is in the OFF state (see (B1) in FIG. 11B). Then in the initial stage of closing of the open-close cover 3, the inner wall face of the open-close cover 3's sideplate 32 contacts against the latching protrusion $9_A$ of the second switch means $SW_2$, the latching protrusion $9_A$ is pushed inward, and the second switch means $SW_2$ switches from OFF to ON (see (B2) in FIG. 11B). At the same time, the latching protrusion $9_A$ enters into the mating hole $32_2$ provided in the sideplates 32, 33 of the open-close cover 3, locking the open-close cover 3 in the closed state (see (B3) in FIG. 11B).

Figure 13A:
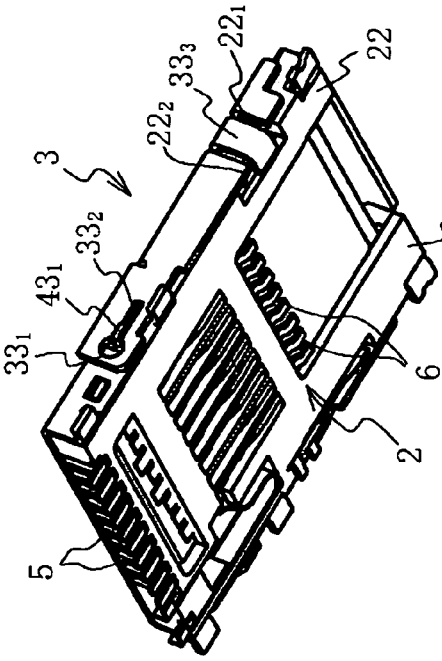
FIG. 13 explicates installation of micro SD and micro MM cards and the locked state of the open-close cover, FIG. 13A being a rear perspective view of the state with the open-close cover unlocked prior to installation of a micro SD card, FIG. 13B being a rear perspective view of the state with a micro SD card installed and the open-close cover locked, FIG. 13C being a rear perspective view of the state with the open-close cover unlocked prior to installation of a micro MM card, and FIG. 13D being a rear perspective view of the state with a micro MM card installed and the open-close cover locked.
Figure 13B:
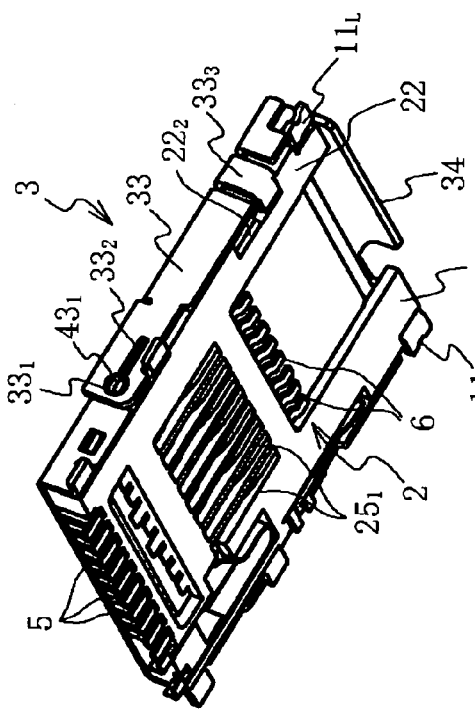
Figure 13C:
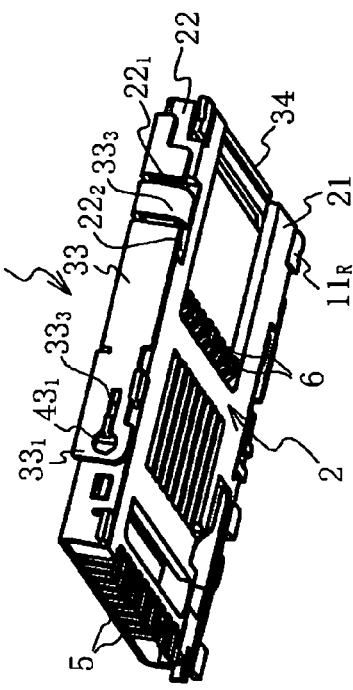
Figure 13D:
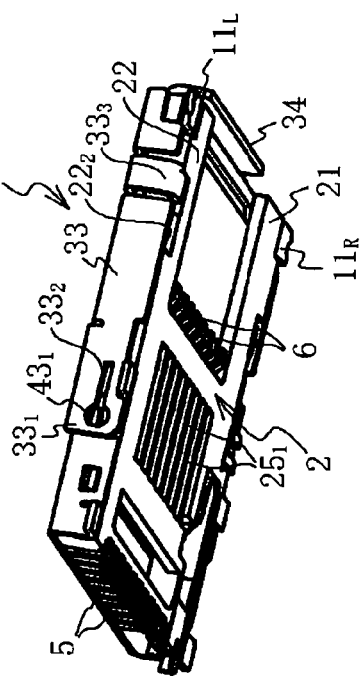
Figure 14A:
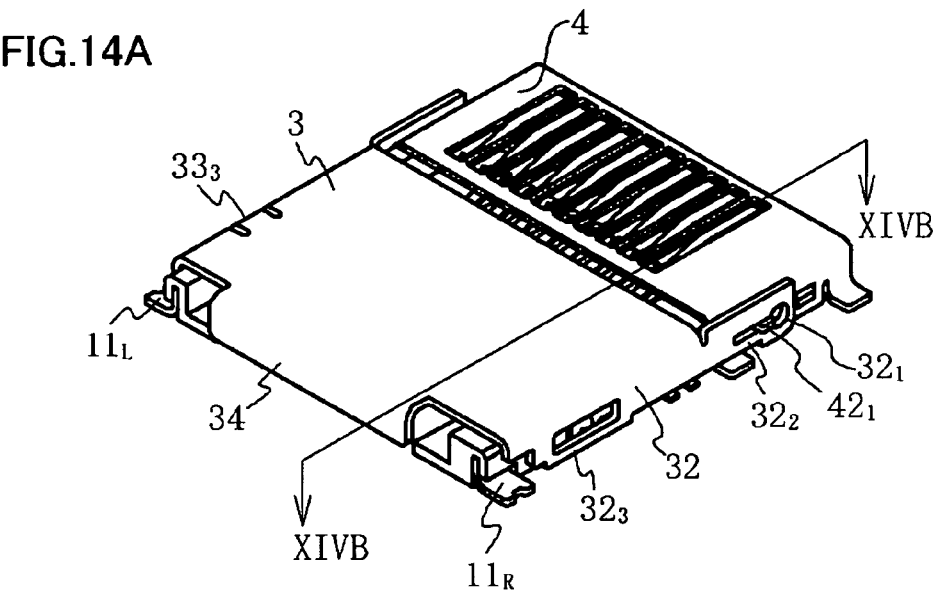
FIG. 14 explicates the card connector in the state where a card is installed therein, FIG. 14A being a perspective view, and FIG. 14B being a cross-sectional view along line XIVB-XIVB in FIG. 14A.
Figure 14B:
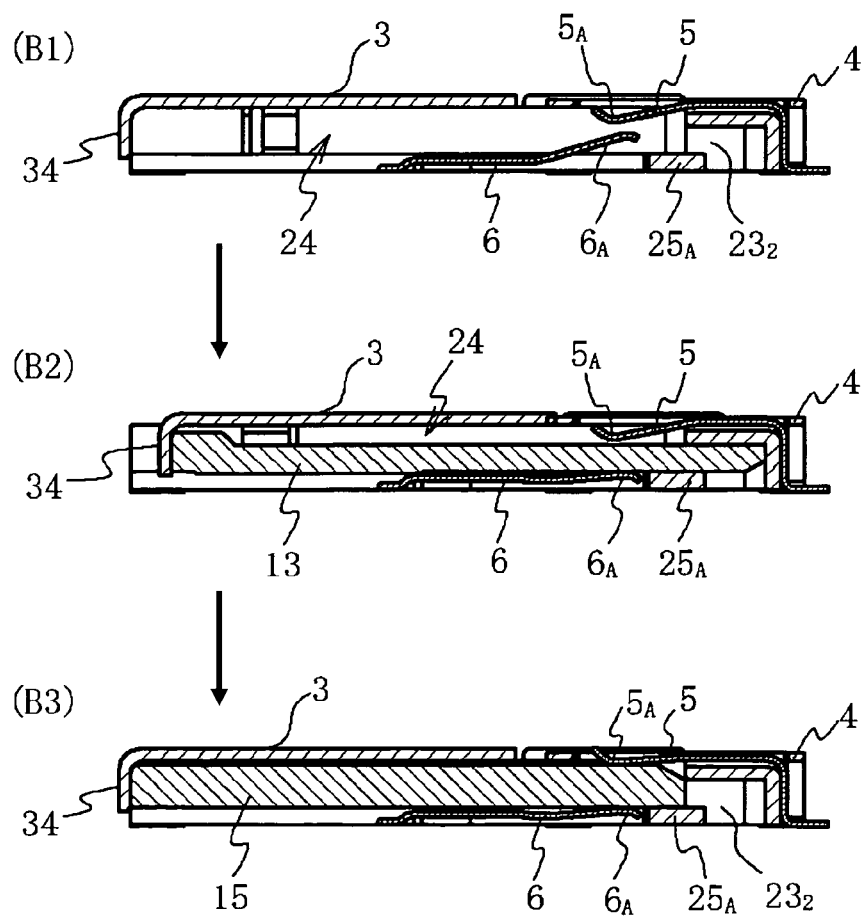

Via such closing manipulation of the open-close cover 3, the latching tab 333 fits into the incised slot $22_1$ in the housing 2, as shown in FIGS. 13C and 14B (B3). Following that, the open-close cover 3 is slid rearward, and thereby the pivot protrusion $42_1$ of the shield cover 4 enters into the latching slit $32_2$ in the open-close cover 3. Through such sliding motion, the latching tab $33_3$ latches onto the latching slot $22_2$ and the open-close cover 3 is locked closed (see FIGS. 12B and 13D). In addition, due to such sliding motion, the latching protrusion $9_A$ moves along inside the mating hole $32_3$, so that the open-close cover 3 is maintained in such locked state. Hence, when a card is installed to the connector 1, incomplete installation of the card can be mechanically sensed via closing manipulation of the open-close cover 3, and moreover the installation status of the card and the locked status of the open-close cover 3 can be electrically sensed via actuation of the first and second switching means $SW_1$, $SW_2$. Actuation of the open-close cover 3 is further locked by the latching thereof to the housing 2 and by the mating of the latching protrusion $9_A$ of the second switch means $SW_2$ into the mating hole $32_3$.

Next is described the installation of the micro SD card 13 into the card holding cavity 24. Before the micro SD card 13 is installed inside the card holding cavity 24, the open-close cover 3 is first opened. Since the interior of the card holding cavity 24 is exposed when the open-close cover 3 is opened, installation of the micro SD card 13 is carried out with roughly the same process as for installation of the micro MM card 15. More precisely, the micro SD card 13 is inserted by bringing the first side edge $13_1$, on which the positioning protrusion $13_C$ is provided, into contact with the inner wall face $21_C$ of the first frame 21, and the reverse face into contact with the lateral bottom plate $25_B$ of the card holding cavity 24, and at the same time bringing the second side edge $13_2$ into contact with the lateral bottom plate $25_C$ and inner wall face $22_C$ of the second frame 22. Through such insertion, the micro SD card 13's leading end portion 13a enters into the aperture $23_2$ and is thereby positioned and secured.

At the same time, the micro SD card 13's first side edge $13_1$ contacts against and pushes outward the projecting curved portion $7_C$ of the movable contact terminal 7, so that the movable contact $7_A$ of the movable contact terminal 7 is detached from the fixed contact $8_A$ of the fixed contact terminal 8 and the first switch means $SW_1$ is turned OFF. The fact that the micro SD card 13 has been installed can be sensed electrically via such turning OFF of the first switch means $SW_1$. After the micro SD card 13 has been inserted inside the card holding cavity 24, the open-close cover 3 is closed. Such closing manipulation is carried out with the same process as for installation of the micro MM card 15. When such closing manipulation is performed, the latching tab $33_3$ fits into the incised slot $22_1$ in the housing 2, as shown in FIGS. 13C and 14B (B2). Following that, the open-close cover 3 is slid rearward, and thereby the pivot protrusion $42_1$ of the shield cover 4 enters into the latching slit $32_2$ in the open-close cover 3. Through such sliding motion, the latching tab $33_3$ latches onto the latching slot $22_2$ and the open-close cover 3 is locked closed (see FIGS. 12A and 13B).

The card connector 1, although described in the foregoing embodiment as being for use with a micro SD card 13 and a micro MM card 15, is not limited to being used with such cards.

What is claimed is:

1. A card connector comprising:
    a connector housing constituted of electrical insulators and capable of housing cards inside a bottomed card holding cavity which is formed therein so as to be enclosed on three sides by an opposed pair of first and second frames and a third frame that links end portions of the first and second frames, and so as to be open at the front and top;
    contact terminals that are deposed inside the connector housing's card holding cavity; and
    an open-close cover that covers the open portions of the connector housing's card holding cavity;
    the open-close cover having a sensing member that senses the installation status of the card, and a cover locking mechanism that latches onto either the first or the second frame and locks the open-close cover in the closed state; and the rear of the open-close cover being rotatably pivoted on the first and second frames and moreover being fixed to the first and second frames so as to be horizontally movable;
    and after installation of a card inside the card holding cavity, the card's installation status being sensed by closing the open-close cover and positioning the sensing member at the rear end portion of the card; and the open-close cover being retracted and being thereby locked in the closed state via the locking mechanism.

2. The card connector according to claim 1, wherein the card holding cavity is formed in a shape that permits cards of differing size and thickness to be housed therein, and the contact terminals that contact with the contacts of such cards are installed inside the card holding cavity.

3. The card connector according to claim 2, wherein the card holding cavity is formed in a shape that permits a first and second card type of differing size and thickness to be housed therein, and the contact terminals consist of first and second contact terminals that are provided inside the card holding cavity and contact with the contacts of the first and second card types respectively.

4. The card connector according to claim 3, wherein the first contact terminals are fixed to the third frame of the connector housing, and the second contact terminals are fixed to the bottom of the connector housing.

5. The card connector according to claim 1, wherein the open-close cover is formed from metal plates comprising a pair of first and second sideplates that cover the outer side surfaces of the first and second frame, a top plate that links the top edges of the sideplates and covers the upper opening of the card holding cavity, and a front cover plate that covers the front opening of the card holding cavity, with the front cover plate serving as the sensing member.

6. The card connector according to claim 1, wherein either the first or the second frame of the connector housing is provided with a first switch means that senses the installation status of the card, and with a second switch means that senses the open/closed status of the open-close cover.

7. The card connector according to claim 6, wherein the first switch means is composed of a first fixed contact terminal having a fixed contact, and a first movable contact terminal having a movable contact that contacts and separates from the fixed contact, together with an actuating part that separates the movable contact from the fixed contact when a card is installed; and the second switch means is composed of a second fixed contact terminal having a fixed contact, and a second movable contact terminal having a movable contact that contacts and separates from the fixed contact, together with an actuating protrusion that separates the movable contact from the fixed contact in interlock with opening/closing manipulation of the open-close cover.

8. The card connector according to claim 7, wherein the actuating protrusion of the second movable contact terminal causes, in interlock with closing manipulation of the open-close cover, the second switch means to execute a series of OFF-ON-OFF operations; in the final OFF state, the actuating protrusion is latched into a latching hole provided in the frame, thereby locking the open-close cover in the closed state.

9. The card connector according to claim 1, wherein the cards include first and second card types, an aperture portion for insertion of the leading end of the first card type, which is long compared to the second card type, is formed in the third frame; so that when a first card type is installed, the leading end of the first card type is inserted into such aperture and thereby is positioned and secured.

10. The card connector according to claim 1, wherein a shield cover made of metal is fitted onto the rear of the connector housing, the open-close cover is formed from metal material, and the open-close cover is pivoted on the shield cover.

* * * * *